US009111393B2

(12) United States Patent
McGuire et al.

(10) Patent No.: US 9,111,393 B2
(45) Date of Patent: Aug. 18, 2015

(54) SYSTEM, METHOD, AND COMPUTER PROGRAM PRODUCT FOR SAMPLING A HIERARCHICAL DEPTH MAP

(71) Applicant: NVIDIA Corporation, Santa Clara, CA (US)

(72) Inventors: Morgan McGuire, Williamstown, MA (US); David Patrick Luebke, Charlottesville, VA (US); Michael Thomas Mara, Williamstown, MA (US)

(73) Assignee: NVIDIA Corporation, Santa Clara, CA (US)

( * ) Notice: Subject to any disclaimer, the term of this patent is extended or adjusted under 35 U.S.C. 154(b) by 334 days.

(21) Appl. No.: 13/685,599

(22) Filed: Nov. 26, 2012

(65) Prior Publication Data

US 2014/0146045 A1 May 29, 2014

(51) Int. Cl.
 *G06T 15/50* (2011.01)
 *G06T 15/40* (2011.01)
 *G06T 15/55* (2011.01)
 *G06T 15/80* (2011.01)
 *G06T 15/60* (2006.01)

(52) U.S. Cl.
 CPC .............. *G06T 15/405* (2013.01); *G06T 15/50* (2013.01); *G06T 15/506* (2013.01); *G06T 15/55* (2013.01); *G06T 15/60* (2013.01); *G06T 15/80* (2013.01); *G06T 2215/12* (2013.01)

(58) Field of Classification Search
 CPC ....... G06T 15/50; G06T 15/506; G06T 15/60; G06T 15/80; G06T 15/55; G06T 2215/12
 USPC .......................................................... 345/426
 See application file for complete search history.

(56) References Cited

U.S. PATENT DOCUMENTS

| | | | |
|---|---|---|---|
| 6,518,966 B1 * | 2/2003 | Nakagawa .................... 345/422 |
| 7,372,471 B1 * | 5/2008 | Hutchins ...................... 345/611 |
| 2004/0239673 A1 * | 12/2004 | Schmidt ........................ 345/426 |
| 2008/0174600 A1 * | 7/2008 | Xie ................................ 345/426 |
| 2008/0218517 A1 * | 9/2008 | Holmdahl ..................... 345/426 |
| 2009/0006051 A1 * | 1/2009 | Zhou et al. ........................ 703/5 |
| 2009/0006052 A1 * | 1/2009 | Zhou et al. ........................ 703/5 |
| 2009/0079747 A1 * | 3/2009 | Johnson et al. ............... 345/506 |
| 2012/0163672 A1 * | 6/2012 | McKinnon .................... 382/106 |

OTHER PUBLICATIONS

Nichols, Greg, Jeremy Shopf, and Chris Wyman. "Hierarchical Image-Space Radiosity for Interactive Global Illumination." Computer Graphics Forum. vol. 28. No. 4. Blackwell Publishing Ltd, 2009.*
Tong, Ting-Chi, and Yun-Nan Chang. "A low cost 2D graphics anti-aliasing rendering scheme." Next-Generation Electronics (ISNE), 2010 International Symposium on. IEEE, 2010.*
(Continued)

*Primary Examiner* — Kee M Tung
*Assistant Examiner* — Ryan M Gray
(74) *Attorney, Agent, or Firm* — Zilka-Kotab, PC

(57) ABSTRACT

A system, process, and computer program product are provided for sampling a hierarchical depth map. An approach for sampling the hierarchical depth map includes the steps of generating a hierarchical depth map and reading a value associated with a sample pixel from a target level of the hierarchical depth map based on a difference between the sample pixel and a target pixel. The hierarchical depth map includes at least two levels.

20 Claims, 7 Drawing Sheets

(56) References Cited

OTHER PUBLICATIONS

Nichols, Greg, and Chris Wyman. "Multiresolution splatting for indirect illumination." Proceedings of the 2009 symposium on Interactive 3D graphics and games. ACM, 2009.*

Hoang, T.-D. et al., "Efficient Screen-Space Approach to High-Quality Multi-Scale Ambient Occlusion," Journal the Visual Computer: International Journal of Computer Graphics, Mar. 2012, vol. 28 Issue 3, pp. 289-304.

Soler, C. et al. "A Deferred Shading Pipeline for Real-Time Indirect Illumination," 2010, Article No. 18.

Examination Report from German Patent Application No. 10 2013 222 685.3, dated Sep. 24, 2014.

McGuire, M. et al., "Scalable Ambient Obscurance," High Performance Graphics, 2012, pp. 97-103, Jun. 25, 2012.

* cited by examiner

SYSTEM, METHOD, AND COMPUTER PROGRAM PRODUCT FOR SAMPLING A HIERARCHICAL DEPTH MAP

FIELD OF THE INVENTION

The present invention relates to computer graphics, and more particularly to the algorithms that utilize depth buffers.

BACKGROUND

Depth buffers store a plurality of values that indicate a depth for surfaces of objects in a three-dimensional scene. Depth buffers are implemented for many types of computer graphics rendering applications. A depth value may be used to determine whether an object is occluded by other objects relative to a particular viewpoint. Typically, a depth buffer includes a plurality of values associated with a corresponding plurality of pixels in a digital image. Each value in the depth buffer may represent the depth of the closest object to a viewpoint corresponding with a particular pixel.

Some algorithms, such as screen space ambient occlusion algorithms, sample a plurality of different values within the depth buffer to calculate an ambient obscurance (AO) value for each pixel. The net performance of these techniques suffers because of a large number of scattered reads of the depth buffer, which yields low cache efficiency. Thus, there is a need for addressing this issue and/or other issues associated with the prior art.

SUMMARY

A system, method, and computer program product are provided for sampling a hierarchical depth map. An approach for sampling the hierarchical depth map includes the steps of generating a hierarchical depth map and reading a value associated with a sample pixel from a target level of the hierarchical depth map based on a difference between the sample pixel and a target pixel. The hierarchical depth map includes at least two levels.

DETAILED DESCRIPTION

Many different types of rendering algorithms utilize depth buffers (i.e., Z buffers) n one or more calculations as part of the algorithm. For example, Ambient Occlusion (AO) algorithms generate a shading effect to approximate the way light radiates in the real world. The AO algorithms determine the amount by which nearby geometry occludes a specific point on a surface. If the nearby geometry occludes the point, then the point may be rendered to include a shadow (e.g., rendered with a lower intensity). However, if nearby geometry does not occlude the point, then the point may be rendered without a shadow (e.g., rendered with a higher intensity). It will be appreciated by one of ordinary skill that performing ambient occlusion calculated in model space (i.e., by sampling each object to determine if the object occludes the point) cannot be performed in real-time at full high definition resolution using conventional GPUs while maintaining interactive frame rates. Therefore, one technique that generates sufficient approximations to a full AO algorithm is screen space ambient occlusion (SSAO).

In SSAO algorithms, the model is first rasterized to produce a depth buffer that associates each pixel location (or sample location if the depth buffer is implemented at a sub-pixel resolution) with a depth of the geometry that is closest to the viewpoint for the pixel. Once the depth buffer is generated, an approximate ambient obscurance for a pixel may be calculated by sampling a plurality of nearby pixels to determine whether that pixel is likely occluded by the nearby geometry. In some SSAO algorithms, both the depth and the surface normal for each pixel may be used to determine the approximate occlusion. Conventional SSAO algorithms have poor performance due to the scattering of the sampled points in the depth buffer, which yields low cache efficiency and generates a large number of long-latency memory access requests.

An exemplary technique for encoding depth buffers is disclosed which improves performance of algorithms that sample a large number of scattered entries in the depth buffer, thereby improving cache efficiency and reducing the number of long-latency memory access requests for sampling nearby entries.

Figure 1:
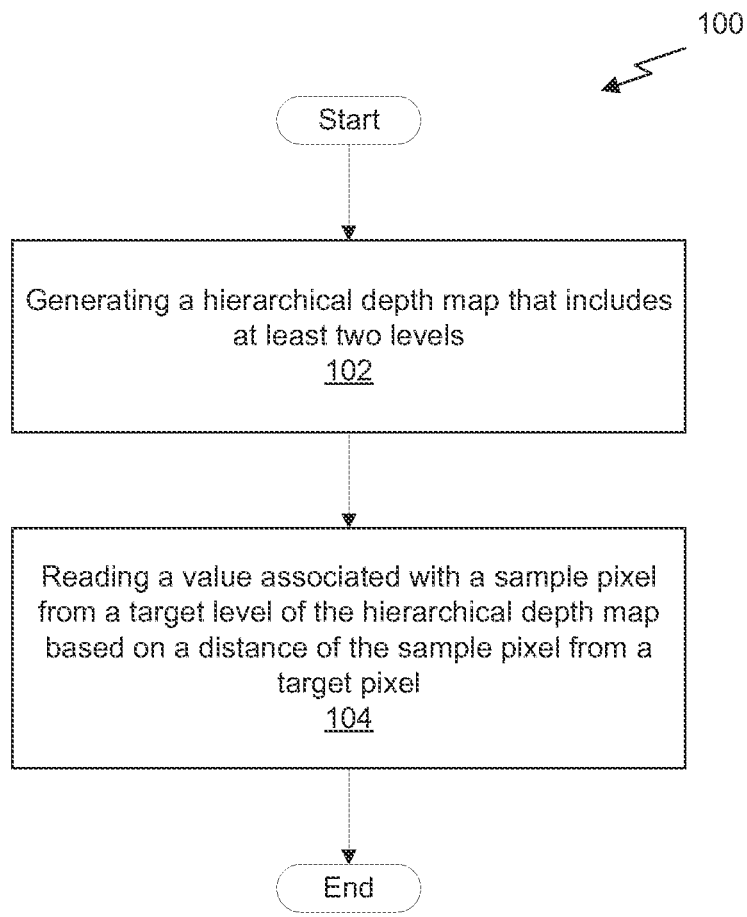
FIG. 1 illustrates a flowchart of a method for sampling a hierarchical depth map, in accordance with one embodiment.

FIG. 1 illustrates a flowchart of a method 100 for sampling a hierarchical depth map, in accordance with one embodiment. At step 102, a hierarchical depth map is generated. In one embodiment, the hierarchical depth map is an array of values having two or more levels, where a first level is populated based on a plurality of values in a depth buffer and a second level is populated with a subset of values from the first level. At step 104, a value associated with a sample pixel is read from a target level of the hierarchical depth map. In one embodiment, the target level is based on a distance of the sample pixel from a target pixel. It should be noted that, while various optional features are set forth herein in connection with the hierarchical depth map, such features are set forth for illustrative purposes only and should not be construed as limiting in any manner.

Figure 2:
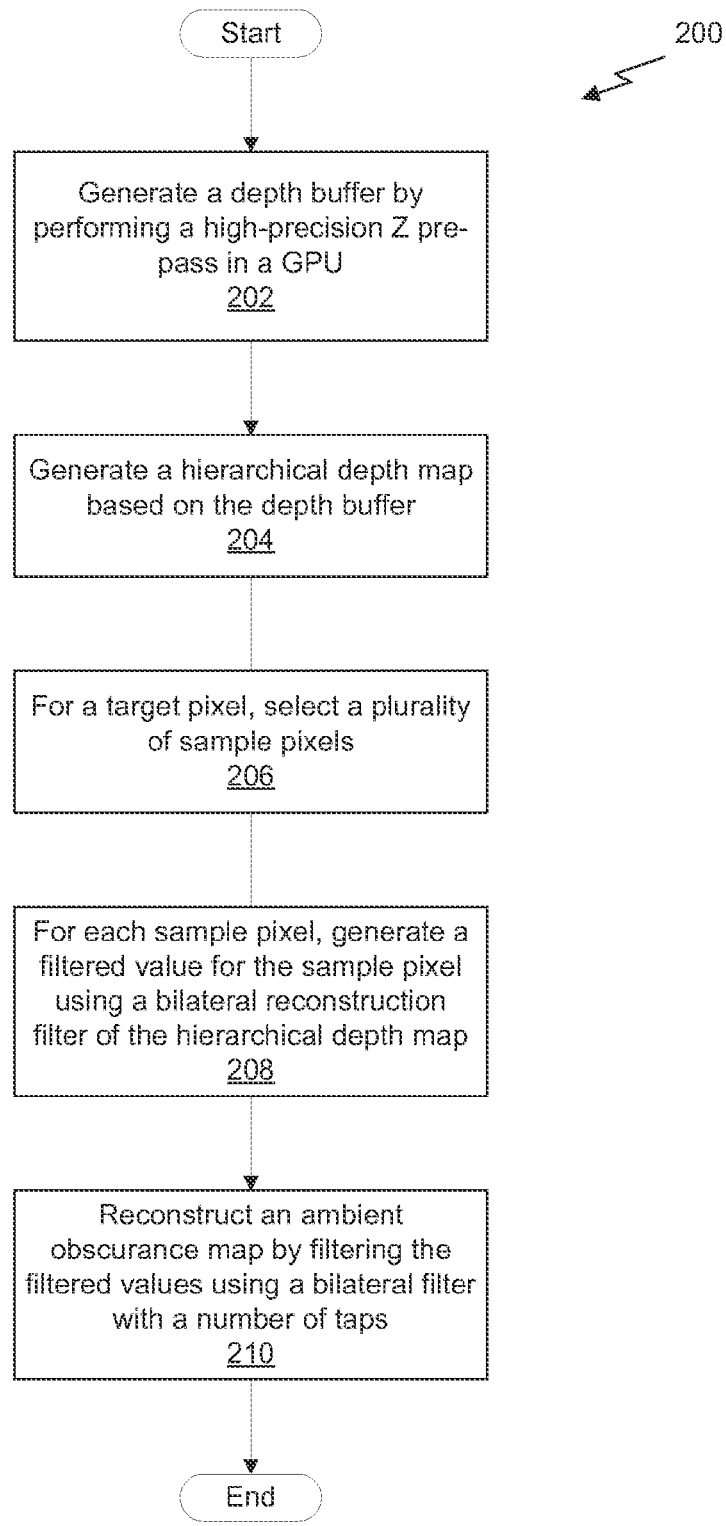
FIG. 2 illustrates a flowchart of a method for implementing an algorithm for scalable ambient obscurance, in accordance with one embodiment.

FIG. 2 illustrates a flowchart of a method 200 for implementing an algorithm for scalable ambient obscurance (SAO), in accordance with one embodiment. It should be strongly noted that the following information is set forth for illustrative purposes and should not be construed as limiting in any manner as other algorithms may utilize hierarchal depth maps in addition to or in lieu of the SAC) algorithm illustrated by the flowchart of FIG. 2.

At step 202, a depth buffer is generated by performing a high-precision Z-pass in a graphics processing unit (GPU). In one embodiment, the high-precision Z-pass is performed as a depth-only pre-pass through a GPU. A set of model data (i.e., graphics primitives such as triangles, quads, or triangle strips) is transmitted to a GPU. The model data is transformed and rasterized in depth to produce a z-coordinate for each fragment (i.e., portion of a pixel associated with a given surface object). The z-coordinate is tested against all other z-coordinates associated with that pixel location to determine the closest object to a particular viewpoint, and if the z-coordinate is the closest object, then the z-coordinate is stored in the depth buffer at an entry corresponding to that pixel location. Once all of the model data has been rasterized, the resulting depth buffer represents the length of a ray from the viewpoint to the closest surface at each pixel location in a rasterized image.

In order to increase the accuracy of results in the SAO algorithm, care should be taken to populate the depth buffer with the highest precision possible. In one embodiment, the precision of the depth buffer may be increased by implementing the following optimizations. A model-view projection matrix may be computed at double precision on a host processor before casting the model-view projection matrix to single precision for transformations performed in vertex shaders on the GPU. For the model-view projection matrix, a far clipping plane may be chosen at a depth of negative infinity ($-\infty$), which may reduce the number of floating point operations performed when calculating the matrix product. In addition, when calculating transformations in the GPU, half a bit of precision may be saved by multiplying vectors on the left of column-major matrices (e.g., the model-view projection matrix). It will be appreciated that the optimizations above are merely suggestions for improving the accuracy of the algorithm and should not be construed as limiting in any manner.

At step 204, a hierarchical depth map is generated based on the depth buffer. In one embodiment, the depth buffer is used to populate a base level of the hierarchical depth map. Typically, the depth buffer generated by GPUs stores depth values as floating point values between zero and one. The base level of the hierarchical depth map converts the depth values in the depth buffer to camera-space values that indicate a z value between the location of the near clipping plane ($z_n$) and the location of the far clipping plane ($z_f$). Successive higher levels of the hierarchical depth map are populated by selecting a subset of values from the next lowest level of the hierarchical depth map. The hierarchical depth map includes at least two levels, a base level corresponding to the full resolution of the digital image, and a first level corresponding to a resolution less than that of the base level (e.g., half the resolution of the base level). The higher levels of the hierarchical depth map (i.e., level 1, level 2, etc.) ensure that spatially distributed samples are read with high cache efficiency (i.e., adjacent pixels processed in parallel by the GPU will typically read the same samples from the hierarchical depth map when sampling pixels farther away from the target pixel location). Because a small region of each level of the hierarchical depth map remains in the cache, fewer read requests will be transmitted to memory (i.e., DRAM), resulting in high bandwidth and low latency.

At step 206, for each target pixel of a digital image for which the SAO algorithm is being executed, a plurality of sample pixels are selected. In one embodiment, for each target pixel, the plurality of sample pixels are distributed on a half-sphere around a point C centered at a point on a surface intersected by a ray projected from the viewpoint in a direction associated with the target pixel. In one embodiment, the point C is reconstructed from a value $z_C$ which is read from the base level of the hierarchical depth map at an index associated with the target pixel given by an x-coordinate (x') and a y-coordinate (y'). The x-coordinate and y-coordinate of point C are given by the equations:

$$x_C = z_C \cdot \left( \frac{1 - P_{0,2}}{P_{0,0}} - \frac{2\left(x' + \frac{1}{2}\right)}{w \cdot P_{0,0}} \right) \quad \text{(Eq. 1)}$$

$$y_C = z_C \cdot \left( \frac{1 + P_{1,2}}{P_{1,1}} - \frac{-2\left(y' + \frac{1}{2}\right)}{h \cdot P_{1,1}} \right) \quad \text{(Eq. 2)}$$

$$\hat{n}_C = \text{normalize}\left( \frac{\partial C}{\partial y'} \times \frac{\partial C}{\partial x'} \right) \quad \text{(Eq. 3)}$$

In Equations 1 and 2, n; and h represent the width and height of the digital image and P is the model-view projection matrix. Equations 1 and 2 invert the projection matrix at a pixel (x', y') to find a camera-space position point C. Equation 3 gives the estimated surface normal at point C based on the screen space gradient of z, which gives the orientation of the half-ball. The world-space radius of the half-ball r corresponds to a screen-space radius r' given by the equation:

$$r' = \frac{-r \cdot S'}{z_C} \quad \text{(Eq. 4)}$$

In Equation 3, S' is the pixel size of a one meter radius object at z equal to negative one meter. In one embodiment, the plurality of sample pixels is placed in a spiral pattern around the target pixel. Each sample pixel ($s_i$) is located at a different distance ($h_i$) from the target pixel given by Equation 7, shown below. The location of each of the sample pixels may be given by the following equation:

$$s_i = \langle x', y' \rangle + h'_i \hat{u}_i \quad \text{(Eq. 5)}$$

$$\alpha_i = \frac{1}{s}(i + 0.5) \quad \text{(Eq. 6)}$$

$$h'_i = r'\alpha_i; \quad \theta_i = 2\pi\alpha_i\tau + \varphi \quad \text{(Eq. 7)}$$

$$\hat{u}_i = \langle \cos\theta, \sin\theta \rangle \quad \text{(Eq. 8)}$$

$$\varphi = 30\overline{x' \oplus y'} + 10x'y' \quad \text{(Eq. 9)}$$

In Equation 7, constant $\tau$ is the number of turns in the spiral and angular offset $\varphi$ is the rotation angle given by Equation 9. In other embodiments, the plurality of sample pixels may be distributed at random on the surface of the half-ball. However, it should be noted that random distribution has the potential to skew the results if the majority of samples are located on only a portion of the half-ball.

At step 208, for each sample pixel associated with a target pixel, a filtered value is generated by applying a bilateral filter to the hierarchical depth map. Each sample pixel is associated with a particular level ($m_i$) of the hierarchical depth map. A sample value for the sample pixel is given by selecting a value in the particular level of the hierarchical depth map associated with the location of the sample pixel, as given by the equation:

$$m_i = \left\lfloor \log_2\left(\frac{h'_i}{q'}\right) \right\rfloor \quad \text{(Eq. 10)}$$

-continued $$z_i = z^{m_i}\left(\frac{\hat{s}_i}{2^{m_i}}\right) \quad \text{(Eq. 11)}$$

In Equation 10, the level ($m_i$) associated with a sample pixel ($s_i$) is clamped to a value greater than or equal to zero and less than or equal to the highest level in the hierarchical depth map. Constant q' is a screen-space radius increment that represents the distance from the target pixel at which the level of the hierarchical depth map referenced by the sample pixel changes to a different level of the hierarchical depth map. In one embodiment, the ratio of $h_i'$ and q' is rounded up to the next highest integer. The optimal value for q' may depend on the architecture implementing the SAO algorithm. Example values for q' that have resulted in accurate ambient obscurance maps as calculated by some experimental architectures are between 8 and 32.

Each sample pixel $s_i$ is reconstructed by applying Equations 1 and 2 to $z_i$ (i.e., $z_C = z_i$). In one embodiment, a bilateral 2×2 filter may be applied to the generated sample pixels, averaging four weighted values to reduce the variance across a continuous surface (i.e., the filter kernel generates the filtered value with Gaussian weights modulated by the difference in depth between the generated sample pixels and nearby pixels).

At step 210, an ambient obscurance map is generated for each of the pixels of the digital image by filtering the raw sample map, generated in step 208, using a bilateral filter with a number of taps. The bilateral filter ensures the final value is smoothed across surfaces while not applying the filter across depth discontinuities. In one embodiment, a two-pass bilateral one-dimensional filter is applied (one horizontal pass and one vertical pass) having seven taps in each pass, which generates a final AO value based on 196 sample values per target pixel (based on the 2×2 bilateral filter applied in step 208 and the 7×7 taps in the two-pass bilateral one-dimensional filter applied in step 210). Each of the taps may be spread out by incrementing the pixel locations by three pixels in each direction. In other embodiments, a different number of taps or distance between taps may be implemented in the two-pass bilateral one-dimensional filter.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
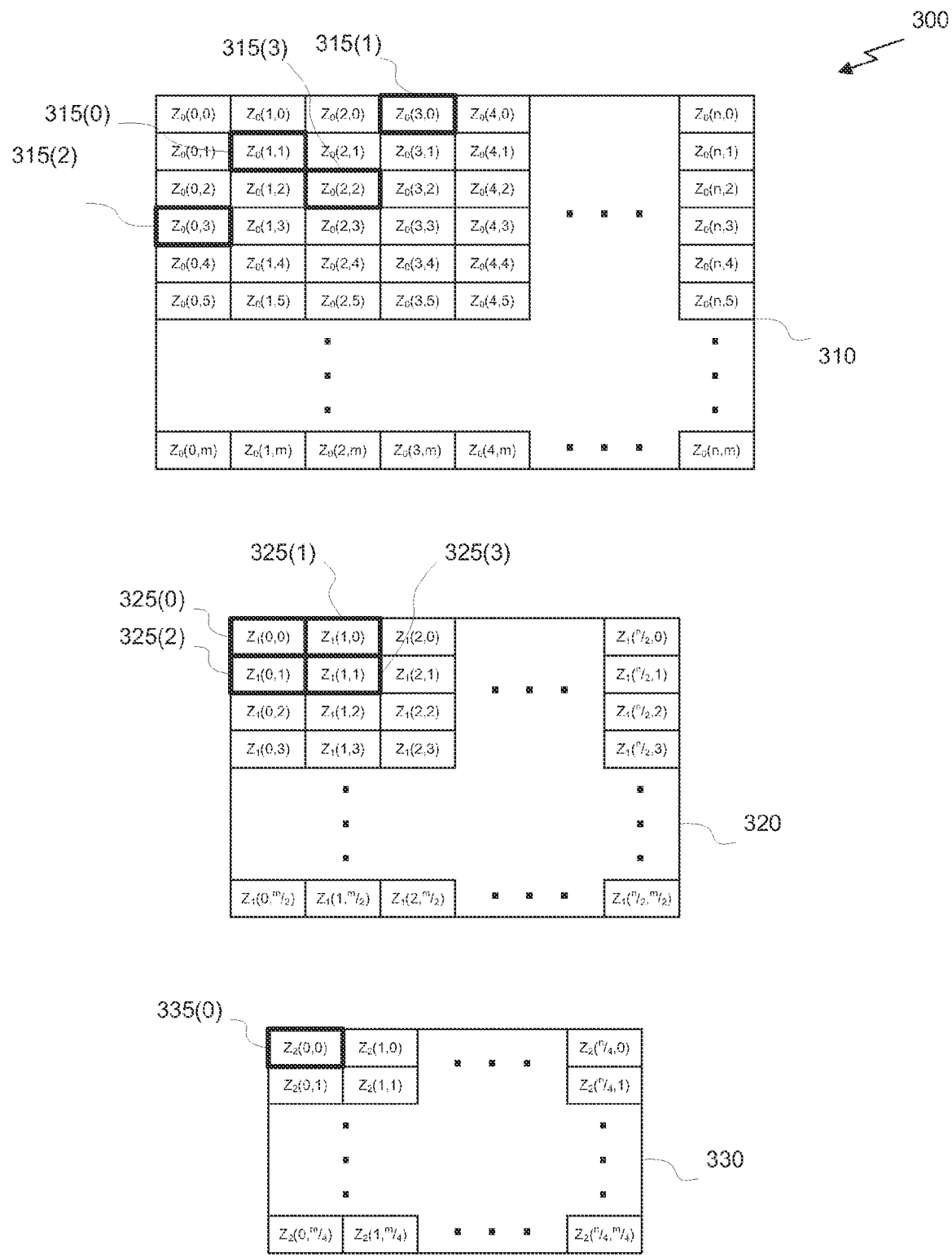
FIG. 3 illustrates a hierarchical depth map, in accordance with one embodiment.

FIG. 3 illustrates a hierarchical depth map 300, in accordance with one embodiment. As shown in FIG. 3, a base level 310 ($Z_0$) of the hierarchical depth map 300 includes a plurality of depth values associated with a corresponding plurality of pixels in a digital image. As is known in the art, a digital image that represents a two-dimensional (2D) view of a set of geometry data may be rendered from a model. For each 3D object in the model, the object (i.e., a primitive such as a triangle or triangle strip) is projected onto a 2D viewing plane and a coverage mask that defines the intersection of a projection of the 3D object with the pixels of the 2D viewing plane is determined. For each of the covered pixels, the depth of the surface of the 3D object at a point that corresponds to the pixel is determined and compared against the depth of each of the previously rendered 3D objects, as stored in a depth buffer. If the depth of the surface of the 3D object is closer to the viewing plane than the depth stored in the depth buffer, then the depth buffer is updated and the pixel is rendered according to the vertex attributes for the object (e.g., color attributes, texture coordinates, etc.).

The base level 310 of the hierarchical depth map 300 is populated from a depth buffer associated with a digital image. In other words, each of the depth values in the base level 310 corresponds to a z value stored in the depth buffer for one of the pixels of the digital image. For example, a first depth value located at entry $Z_0(0,0)$ in the base level 310 corresponds to a first pixel in the digital image located at the upper left corner of the digital image. In some embodiments, each of the depth values corresponds to a portion of a pixel of the digital image, such as embodiments where multi-sample antialiasing (MSAA) is implemented in the graphics pipeline.

The hierarchical depth map 300 includes additional levels (e.g., etc.) that include a subset of values from the base level 310 of the hierarchical depth map 300. The resolution of each of the additional levels may be smaller than the next lower level within the hierarchy. For example, in one embodiment, the resolution of the first level 320 of the hierarchical depth map 300 is half (both vertically and horizontally) that of the base level 310 of the hierarchical depth map 300. In other embodiments, the resolution of each successive level of the hierarchical depth map 300 may be reduced by a different amount, such as the reduction of the resolution by a quarter with each successive level of the hierarchical depth map 300.

As shown in FIG. 3, the hierarchical depth map 300 includes a first level 320 ($Z_1$) at half the resolution of the base level 310 of the hierarchical depth map 300. Each of the depth values stored in the first level 320 ($Z_1$) corresponds to a single one of the depth values stored in the base level 310 of the hierarchical depth map 300. Unlike a mip-map, where the values in the lower resolution mip-maps are calculated as an average of multiple values sampled from a higher resolution mip-map, each of the values in a particular level of the hierarchical depth map 300 is selected from one of every N values (e.g., one out of every 4 values) of the previous level in the hierarchy.

In one embodiment, the values selected from the next lower level of the hierarchical depth map 300 are selected based on a rotated grid pattern. An equation governing the selection of values according to one such rotated grid pattern is illustrated by Equation 12:

$$z_{m+1}\langle x',y'\rangle = z_m\langle 2x'+(\overline{(y'\&0b1)\oplus0b1}),2y'+(\overline{(x'\&0b1)\oplus0b1})\rangle \quad \text{(Eq. 12)}$$

In other words, a depth value stored in an m+1 level of the hierarchical depth map 300 having an x' coordinate and a y' coordinate is selected from an m level of the hierarchical depth map 300 that (1) has a first coordinate calculated as two times the x' coordinate plus an exclusive bitwise OR of one and a bitwise AND of the y' coordinate and one; and (2) has a second coordinate calculated as two times the y' coordinate plus an exclusive bitwise OR of one and a bitwise AND of the x' coordinate and one. The rotated grid pattern set forth above selects four depth values for every sixteen depth values in a particular level of the hierarchical depth map 300 to generate four corresponding values in the next successive level of the hierarchical depth map 300. Other embodiments may select the depth values based on a different type of mapping, such as a mapping that selects the upper left value in every 2×2 array of pixels or a mapping that selects four depth values for every sixty-four depth values (in the case where resolution is quartered). It is contemplated that other types of mappings are within the scope of the present disclosure.

FIG. 3 shows the mapping using the rotated grid pattern illustrated by Equation 12. As shown in FIG. 3, a first depth value 325(0) in the first level 320 of the hierarchical depth map 300 corresponds to a corresponding first depth value 315(0) in the base level 310 of the hierarchical depth map 300. According to Equation 12, the first depth value 325(0) is associated with coordinates (e.g., 0,0) for entry $Z_1(0,0)$, which corresponds to entry $Z_0(1,1)$ in the base level 310 of the hierarchical depth map 300. Similarly, a second depth value 325(1) in the first level 320 of the hierarchical depth map 300 corresponds to a second corresponding depth value 315(1) in the base level 310 of the hierarchical depth map 300, a third depth value 325(2) in the first level 320 of the hierarchical depth map 300 corresponds to a third corresponding depth value 315(2) in the base level 310 of the hierarchical depth map 300, and a fourth depth value 325(3) in the first level 320 of the hierarchical depth map 300 corresponds to a fourth corresponding depth value 315(3) in the base level 310 of the hierarchical depth map 300. The second depth value 325(1) is associated with coordinates (e.g., 1,0) for entry $Z_1(1,0)$, which corresponds to entry $Z_0(3,0)$ in the base level 310 of the hierarchical depth map 300. The third depth value 325(2) is associated with coordinates (e.g., 0,1) for entry $Z_1(0,1)$, which corresponds to entry $Z_0(0,3)$ in the base level 310 of the hierarchical depth map 300. The second depth value 325(3) is associated with coordinates (e.g., 1,1) for entry $Z_1(1,1)$, which corresponds to entry $Z_0(2,2)$ in the base level 310 of the hierarchical depth map 300.

The hierarchical depth map 300 also includes a second level 330 ($Z_2$) at half the resolution of the first level 320 of the hierarchical depth map 300. In other words, the second level 330 is at quarter the resolution of the base level 310 of the hierarchical depth map 300. The depth values stored in entries of the second level 330 correspond to depth values stored in entries of the first level 320 of the hierarchical depth map 300 according to the same mapping that is used to map depth values stored in entries of the first level 320 depth values stored in entries of the base level 310 of the hierarchical depth map 300. For example, a first depth value 335(0) stored in entry $Z_2(0,0)$ in the second level 330 of the hierarchical depth map 300 corresponds to a fourth depth value 325(3) stored in entry $Z_1(1,1)$ in the first level 320 of the hierarchical depth map 300. The first depth value 335(0) stored in entry $Z_2(0,0)$ in the second level 330 of the hierarchical depth map 300 also corresponds to a fourth depth value 315(3) stored in entry $Z_0(2,2)$ in the base level 310 of the hierarchical depth map 300. In one embodiment, the different levels of the hierarchical depth map 300 may be generated in parallel.

Although not shown, additional levels may be included in the hierarchal depth map 300 up to a final level (i.e., a $K^{th}$ level) that only includes a single depth value stored in entry $Z_K(0,0)$. Specific implementations may omit any number of levels of the hierarchal depth map 300 as long as the hierarchal depth map 300 includes at least one additional level in addition to the base level 310.

Figure 4:
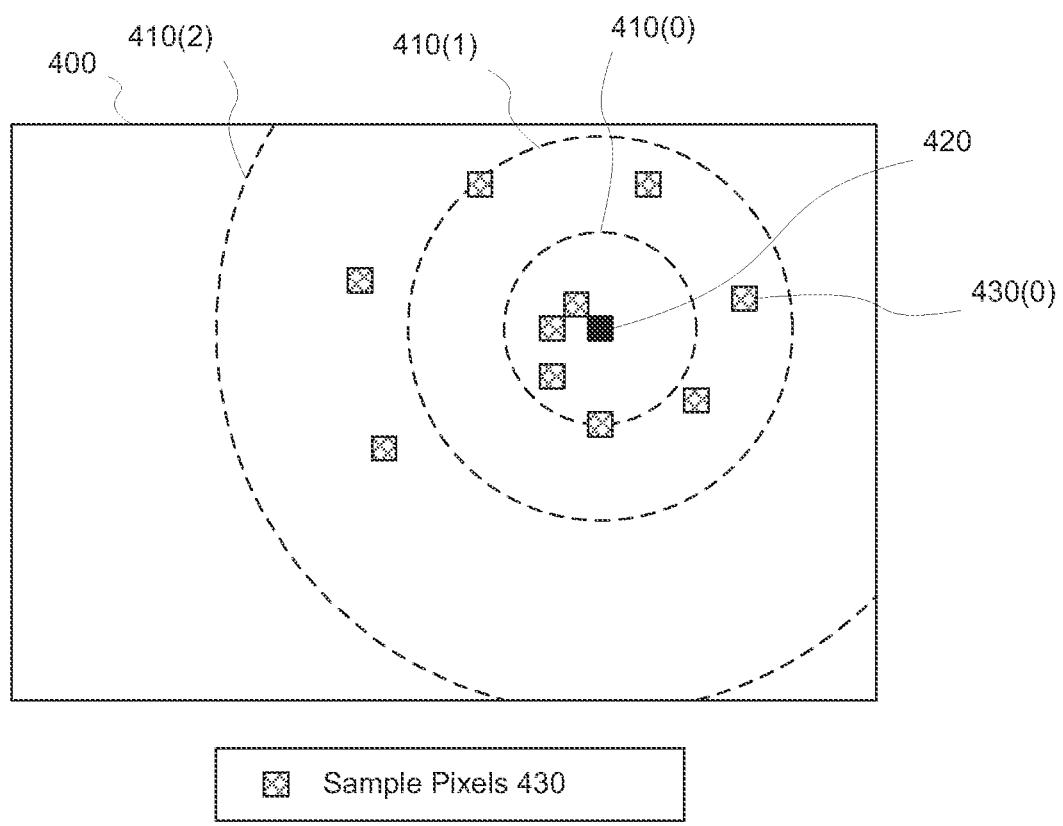
FIG. 4 illustrates an a plurality of sample pixels for a target pixel in a scalable ambient obscurance algorithm, in accordance with one embodiment.

FIG. 4 illustrates a plurality of sample pixels 430 for a target pixel 420 in an SAO algorithm, in accordance with one embodiment. The SAO algorithm highlights one technique for sampling values from the hierarchal depth map 300 to generate an ambient obscurance map, as described above in the flowchart of FIG. 2. In order to calculate an ambient obscurance value for a target pixel 420 in a digital image, SAO algorithms sample a plurality of points in a depth buffer in order to determine whether nearby geometry is likely to occlude a point on the surface of an object corresponding to the target pixel. In order to calculate the ambient obscurance value for the target pixel 420, a process (i.e., one or more threads) samples a plurality of locations in the hierarchal depth map 300 that correspond to a plurality of sample pixels 430 nearby the target pixel 420 in the digital image 400.

In one embodiment, when reading a sample from the hierarchal depth map 300, a thread determines which level $m_i$ of the hierarchal depth map 300 the sample should be read from, such as by applying Equation 10 to the location of the sample pixel 430. The circles 410 represent the portion of the screen space corresponding to different levels of the hierarchical depth map 300. For example, the first circle 410(0) represents one (i.e., $2^0$) times $q_i$ and has a radius of four pixels. The second circle 410(1) represents two (i.e., $2^1$) times $q_i$ and has a radius of eight pixels. The third circle 410(2) represents four (i.e., $2^2$) times $q_i$ and has a radius of sixteen pixels. As stated above, the screen-space radius increment $q_i$ is typically between 8 and 32 for good results. However, a screen-space radius increment of four pixels is shown in FIG. 4 for illustrative purposes.

Reading a depth value for each sample pixel 430 located inside the first circle 410(0) is performed by reading a value from the base level 310 of the hierarchical depth map 300. Reading a depth value for each sample pixel 430 located between the first circle 410(0) and the second circle 410(1) is performed by reading a depth value from the first level 320 of the hierarchical depth map 300. Reading a depth value for each sample pixel 430 located between the second circle 410(1) and the third circle 410(2) is performed by reading a depth value from the second level 320 of the hierarchical depth map 300, and so forth.

For example, as shown in FIG. 4, a target pixel 420 may have an x-coordinate of 24 and a y-coordinate of 8 with respect to the upper left pixel of the digital image 400 (i.e., a pixel with an x-coordinate of 0 and a y-coordinate of 0). Each of the shaded pixels in FIG. 4 represents a sample pixel 430 used in the calculation of the ambient obscurance value. The sample pixel 430(0) is located at an x-coordinate of 30 and a y-coordinate of 7 with respect to the upper left pixel of the digital image 400. In order to determine which level of the hierarchical depth map 300 to read the depth value associated with sample pixel 430(0), the distance of the sample pixel 430(0) to the target pixel 420 is calculated. As shown in FIG. 4, the distance $h_i$ for sample pixel 430(0) is approximately 5 pixels, and the value zi for sample pixel 430(0) is read from the first level 320 of the hierarchical depth map 300.

Figure 5:
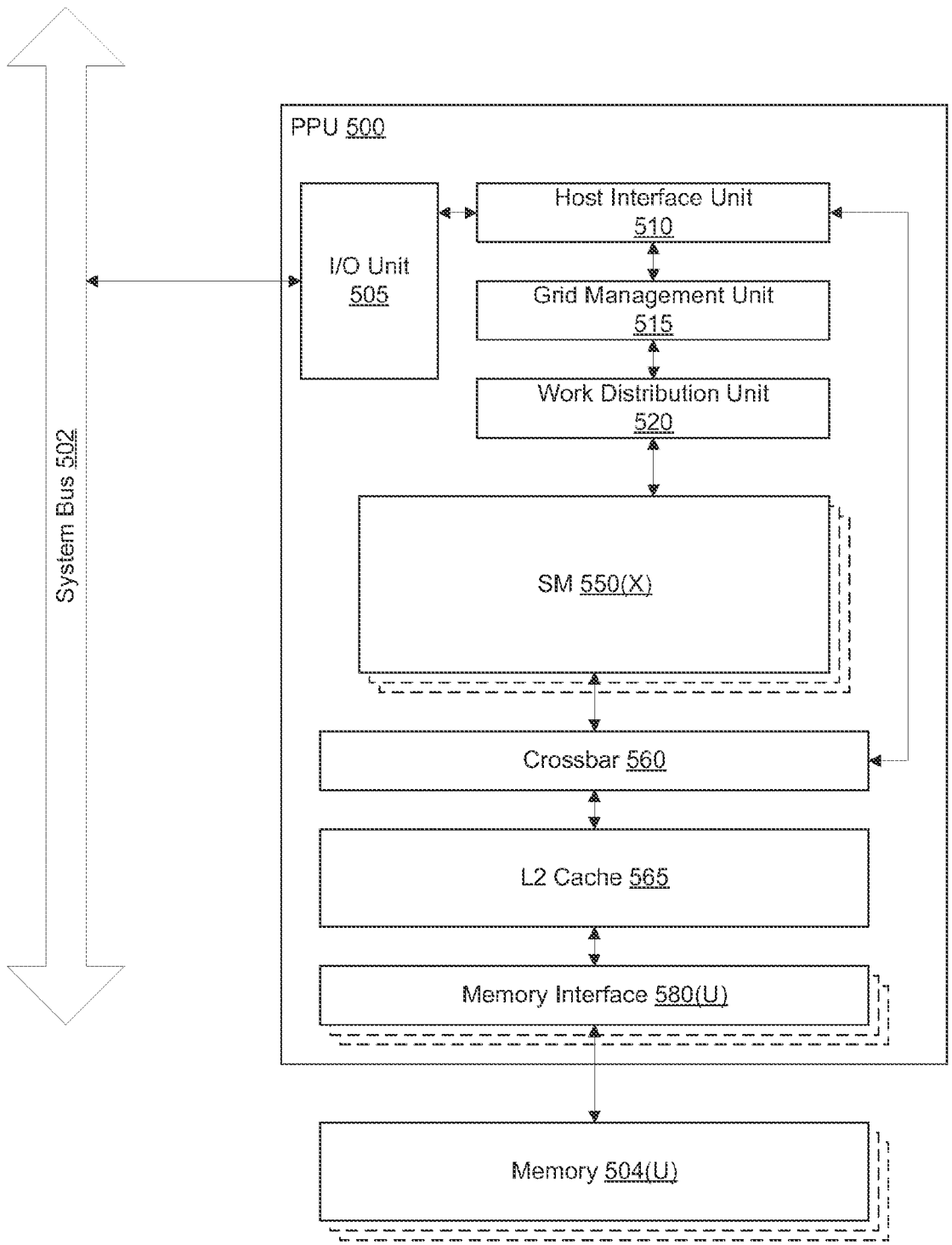
FIG. 5 illustrates a parallel processing unit (PPU), according to one embodiment.

FIG. 5 illustrates a parallel processing unit (PPU) 500, according to one embodiment. While a parallel processor is provided herein as an example of the PPU 500, it should be strongly noted that such processor is set forth for illustrative purposes only, and any processor may be employed to supplement and/or substitute for the same. In one embodiment, the PPU 500 is configured to execute a plurality of threads concurrently in two or more streaming multi-processors (SMs) 550. A thread (i.e., a thread of execution) is an instantiation of a set of instructions executing within a particular SM 550. Each SM 550, described below in more detail in conjunction with FIG. 6, may include, but is not limited to, one or more processing cores, one or more load/store units (LSUs), a level-one (L1) cache, shared memory, and the like.

in one embodiment, the PPU 500 includes an input/output (I/O) unit 505 configured to transmit and receive communications (i.e., commands, data, etc.) from a central processing unit (CPU) (not shown) over the system bus 502. The I/O unit 505 may implement a Peripheral Component Interconnect Express (PCIe) interface for communications over a PCIe bus. In alternative embodiments, the I/O unit 505 may implement other types of well-known bus interfaces.

The PPU 500 also includes a host interface unit 510 that decodes the commands and transmits the commands to the grid management unit 515 or other units of the PPU 500 (e.g., memory interface 580) as the commands may specify. The host interface unit 510 is configured to route communications between and among the various logical units of the PPU 500.

In one embodiment, a program encoded as a command stream is written to a buffer by the CPU. The buffer is a region in memory, e.g., memory 504 or system memory, that is accessible (i.e., read/write) by both the CPU and the PPU 500. The CPU writes the command stream to the buffer and then transmits a pointer to the start of the command stream to the PPU 500. The host interface unit 510 provides the grid management unit (GMU) 515 with pointers to one or more streams. The GMU 515 selects one or more streams and is configured to organize the selected streams as a pool of pending grids. The pool of pending grids may include new grids that have not yet been selected for execution and grids that have been partially executed and have been suspended.

A work distribution unit 520 that is coupled between the GMU 515 and the SMs 550 manages a pool of active grids, selecting and dispatching active grids for execution by the SMs 550. Pending grids are transferred to the active grid pool by the GMU 515 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 520. In addition to receiving grids from the host interface unit 510 and the work distribution unit 520, the GMU 510 also receives grids that are dynamically generated by the SMs 550 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 500. An application may include instructions (i.e., API calls) that cause the driver kernel to generate one or more grids for execution. In one embodiment, the PPU 500 implements a SIMD (Single-Instruction, Multiple-Data) architecture where each thread block (i.e., warp) in a grid is concurrently executed on a different data net by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 500 comprises X SMs 550 (X). For example, the PPU 100 may include 15 distinct SMs 550. Each SM 550 is multi-threaded and configured to execute a plurality of threads (e.g., 32 threads) from a particular thread block concurrently. Each of the SMs 550 is connected to a level-two (L2) cache 565 via a crossbar 560 (or other type of interconnect network). The L2 cache 565 is connected to one or more memory interfaces 580. Memory interfaces 580 implement 16, 32, 64, 128-bit data buses, or the like, for high-speed data transfer. In one embodiment, the Pal 500 comprises U memory interfaces 580(U), where each memory interface 580(U) is connected to a corresponding memory device 504(U). For example, PPU 500 may be connected to up to 6 memory devices 504, such as graphics double-data-rate, version 5, synchronous dynamic random access memory (GDDR5 SDRAM).

In one embodiment, the PPU 500 implements a multi-level memory hierarchy. The memory 504 is located off-chip in SDRAM coupled to the Pal 500. Data from the memory 504 may be fetched and stored in the L2 cache 565, which is located on-chip and is shared between the various SMs 550. In one embodiment, each of the SMs 550 also implements an L1 cache. The L1 cache is private memory that is dedicated to a particular SM 550. Each of the L1 caches is coupled to the shared L2 cache 565. Data from the L2 cache 565 may be fetched and stored in each of the L1 caches for processing in the functional units of the SMs 550.

In one embodiment, the PPU 500 comprises a graphics processing unit (GPU). The PPU 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 500 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, shader, geometry shader, pixel shader, etc. For example, the GMU 515 may configure one or more SMs 550 to execute a vertex shader program that processes a number of vertices defined by the model data. In one embodiment, the GMU 515 may configure different SMs 550 to execute different shader programs concurrently. For example, a first subset of SMs 550 may be configured to execute a vertex shader program while a second subset of SMs 550 may be configured to execute a pixel shader program. The first subset of SMs 550 processes vertex data to produce processed vertex data and writes the processed vertex data to the L2 cache 565 and/or the memory 504. After the processed vertex data is rasterized (i.e., transformed from three-dimensional data into two-dimensional data in screen space) to produce fragment data, the second subset of SMs 550 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 500 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 500 is embodied on a single semiconductor substrate. In another embodiment, the PPU 500 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 500 may be included on a graphics card that includes one or more memory devices 504 such as GDDR5 SDRAM. The graphics card may be configured to interface with a PCIe slot on a motherboard of a desktop computer that includes, e.g., a northbridge chipset and a southbridge chipset. In yet another embodiment, the PPU 500 may be an integrated graphics processing unit (iGPU) included in the chipset (i.e., Northbridge) of the motherboard.

Figure 6:
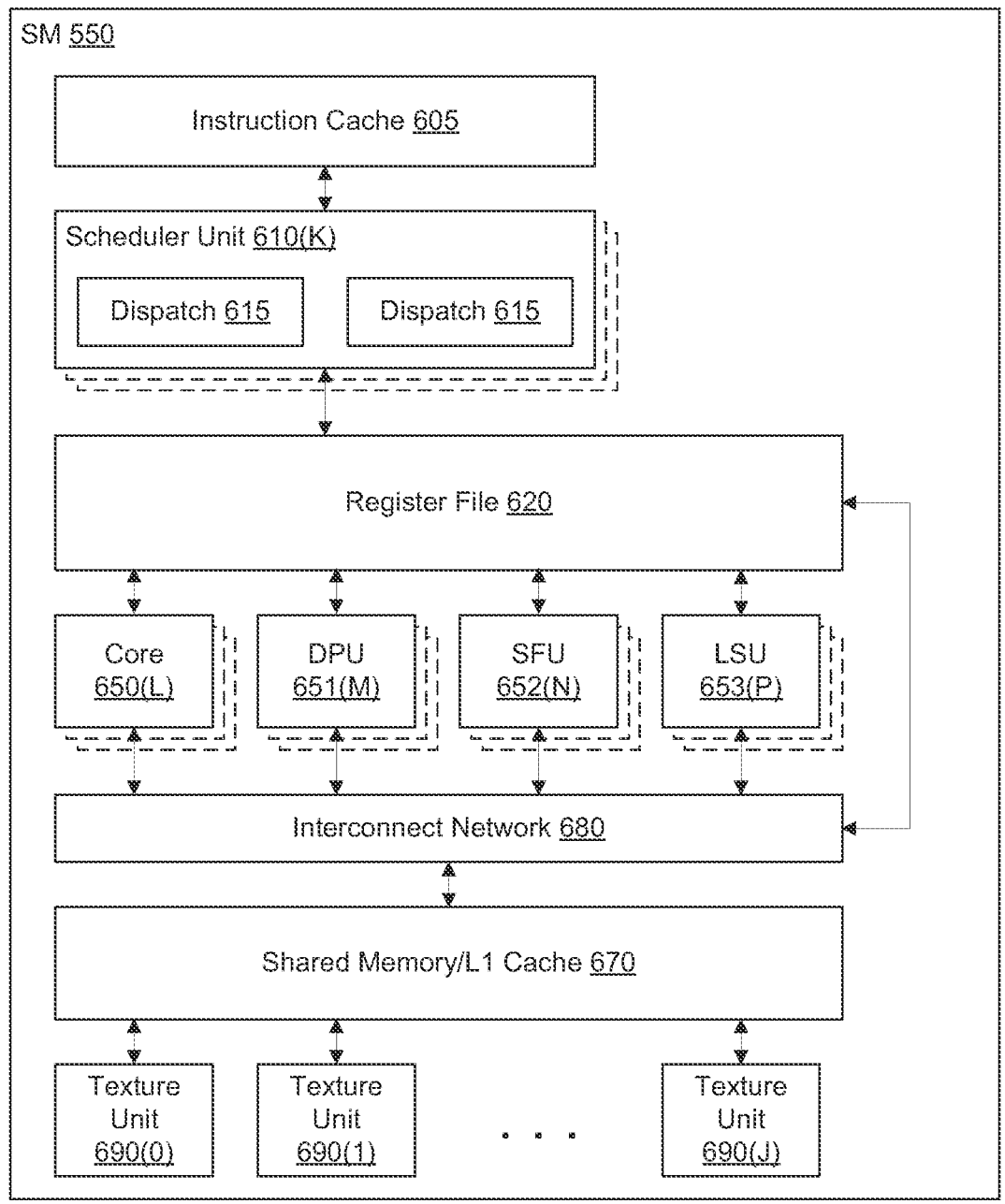
FIG. 6 illustrates the streaming multi-processor of FIG. 5, according to one embodiment.

FIG. 6 illustrates the streaming multi-processor 550 of FIG. 5, according to one embodiment. As shown in FIG. 6, the SM 550 includes an instruction cache 605, one or more scheduler units 610, a register file 620, one or more processing cores 650, one or more double precision units (DPUs) 651, one or more special function units (SFUs) 652, one or more load/store units (LSUs) 653, an interconnect network 680, a shared memory/L1 cache 670, and one or more texture units 690.

As described above, the work distribution unit 520 dispatches active grids for execution on one or more SMs 550 of the PPU 500. The scheduler unit 610 receives the grids from the work distribution unit 520 and manages instruction scheduling for one or more thread blocks of each active grid. The scheduler unit 610 schedules threads for execution in groups of parallel threads, where each group is called a warp. In one embodiment, each warp includes 32 threads. The scheduler unit 610 may manage a plurality of different thread blocks, allocating the thread blocks to warps for execution and then scheduling instructions from the plurality of different warps on the various functional units (i.e., cores 650, DPUs 651, SFUs 652, and LSUs 653) during each clock cycle.

In one embodiment, each scheduler unit 610 includes one or more instruction dispatch units 615. Each dispatch unit 615 is configured to transmit instructions to one or more of the functional units. In the embodiment shown in FIG. 6, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each SM 650 includes a register file 620 that provides a set of registers for the functional units of the SM 650. In one embodiment, the register file 620 is divided between each of the functional units such that each functional unit is allocated a dedicated portion of the register file 620. In another embodiment, the register file 620 is divided between the different warps being executed by the SM 550. The register file 620 provides temporary storage for operands connected to the data paths of the functional units.

Each SM 550 comprises L processing cores 650. In one embodiment, the SM 550 includes a large number (e.g., 192, etc.) of distinct processing cores 650. Each core 650 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 550 also comprises M DPUs 651 that implement double-precision floating point arithmetic, N SFUs 652 that perform special functions (e.g., copy rectangle, pixel blending operations, and the like), and P LSUs 653 that implement load and store operations between the shared memory/L1 cache 670 and the register file 620. In one embodiment, the SM 550 includes 64 DPUs 651, 32 SFUs 652, and 32 LSUs 653.

Each SM 550 includes an interconnect network 680 that connects each of the functional units to the register file 620 and the shared memory/L1 cache 670. In one embodiment, the interconnect network 680 is a crossbar that can be configured to connect any of the functional units to any of the registers in the register file 620 or the memory locations in shared memory/L1 cache 670.

In one embodiment, the SM 550 is implemented within a GPU. In such an embodiment, the SM 550 comprises J texture units 690. The texture units 690 are configured to load texture maps (i.e., a 2D array of texels) from the memory 504 and sample the texture maps to produce sampled texture values for use in shader programs. The texture units 690 implement texture operations such as anti-aliasing operations using mip-maps (i.e., texture maps of varying levels of detail). In one embodiment, the SM 550 includes 16 texture units 690.

The PPU 500 described above may be configured to perform highly parallel computations much faster than conventional CPUs. Parallel computing has advantages in graphics processing, data compression, biometrics, stream processing algorithms, and the like.

For example, an application in memory 104 may be configured to generate the hierarchical depth map 300 using PPU 500. In one embodiment, the application transmits commands to PPU 500 through the driver kernel that cause PPU 500 to generate a depth buffer for a three-dimensional scene. The application may then read the depth buffer (from memory 104 or by querying PPU 500 through the driver kernel) to generate the hierarchical depth map 300. In one embodiment, the hierarchical depth map 300 may be encoded as a texture map, and the steps of the SAO algorithm may be performed in parallel for different target pixels of the digital image by implementing a pixel shader executed on PPU 500. The threads of the pixel shader may correspond to a particular target pixel of the digital image and the ambient obscurance map may be generated by PPU 500.

Figure 7:
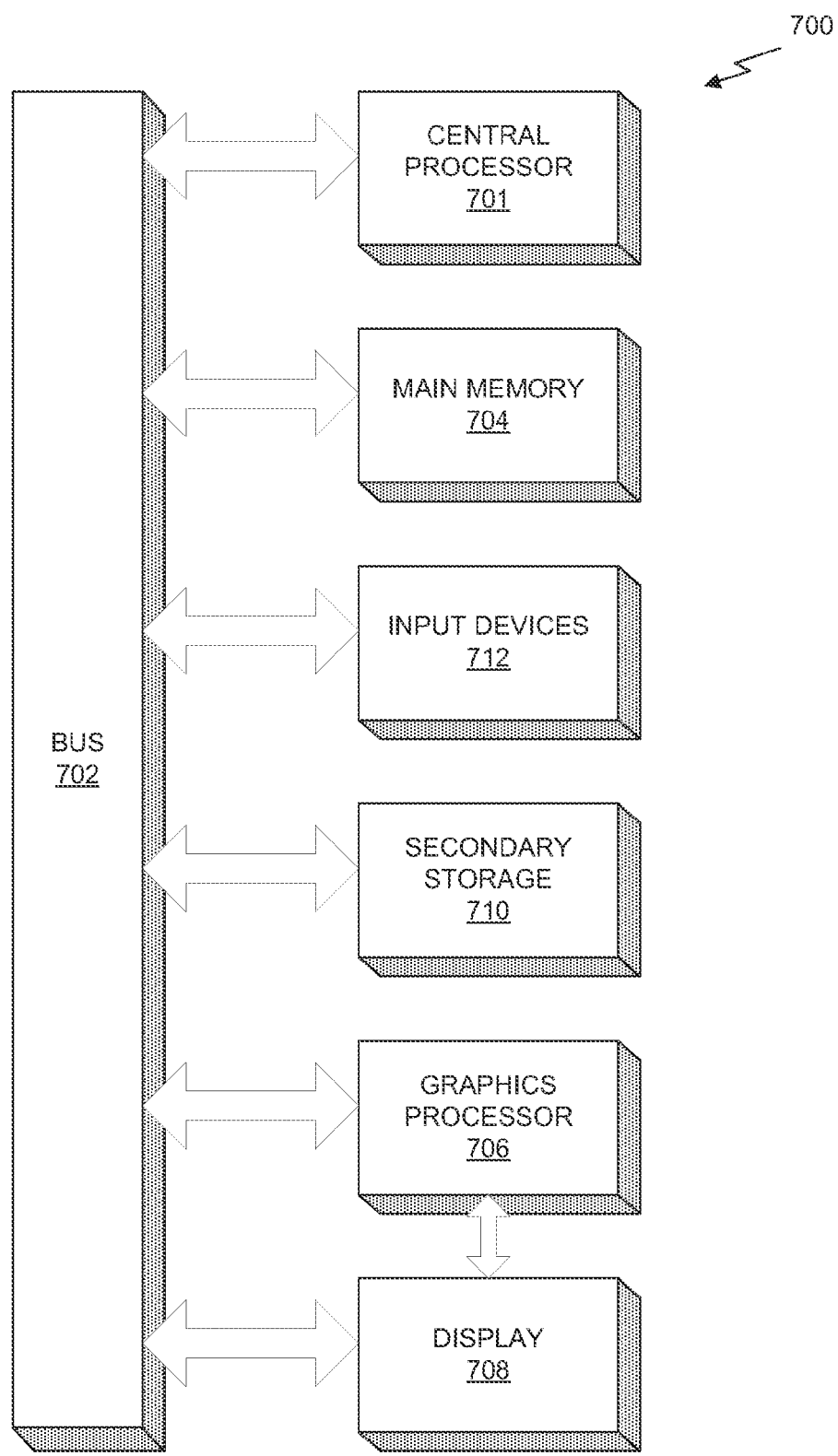
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (CPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   generating a hierarchical depth map including at least two levels; and
   reading a value associated with a sample pixel from a target level of the hierarchical depth map based on a difference between the sample pixel and a target pixel,
   wherein the target level of the hierarchical depth map is calculated by taking a base two logarithm of a ratio of a distance between a screen-space location of the sampled pixel and a screen-space location of a target pixel to a screen space radius increment value;
   generating an ambient obscurance map based on the value associated with the sample pixel.

2. The method of claim 1, the hierarchical depth map comprising:
   a base level at a first resolution; and
   a first level at a second resolution, wherein the second resolution is less than the first resolution.

3. The method of claim 2, wherein the second resolution is half the resolution of the first resolution.

4. The method of claim 2, the hierarchical depth map further comprising a second level at a third resolution, wherein the third resolution is less than the second resolution.

5. The method of claim 2, wherein the base level stores a plurality of values, each value being associated with a different pixel of a digital image, and wherein the first level stores a subset of values selected from the base level.

6. The method of claim 5, wherein the subset of values is selected based on a rotated grid pattern.

7. The method of claim 6, wherein the rotated grid pattern is governed by a function that maps a value at a particular level of the hierarchical depth map to a selected value at the next lower level of the hierarchical depth map, wherein the value is associated with a first coordinate and a second coordinate and the selected value is associated with a third coordinate that is equal to the sum of two times the first coordinate and an exclusive bitwise OR of one and a bitwise AND of the second coordinate and one and a fourth coordinate that is equal to the sum of two times the second coordinate and an exclusive bitwise OR of one and a bitwise AND of the first coordinate and one.

8. The method of claim 1, wherein the screen space radius increment value is determined based on at least one of: a resolution of a digital image, a number of cores of a graphics processing unit that are configured to access the hierarchical depth map in parallel, and a size of a cache configured to temporarily store portions of the hierarchical depth map.

9. The method of claim 1, wherein generating the hierarchical depth map comprises:
   rendering a plurality of three-dimensional objects in a graphics processor to generate a depth buffer;
   populating a base level of the hierarchical depth map based on the values in the depth buffer; and
   generating a first level of the hierarchical depth map by selecting a subset of values from the base level of the hierarchical depth map.

10. The method of claim 1, further comprising:
    selecting a plurality of sample pixels associated with the target pixel;
    for each particular sample pixel of the plurality of sample pixels:
       determining a corresponding level of the hierarchical depth map for the particular sample pixel, and
       reading a sample value for the particular sample pixel from the target level of the hierarchical depth map.

11. The method of claim 10, further comprising applying a bilateral filter to a 2×2 array of sample values corresponding to a 2×2 array of target pixels to generate a filtered sample value.

12. The method of claim 11, wherein generating the ambient obscurance map comprises applying a two-pass bilateral filter having a number of taps to a map of filtered sample values read from the hierarchical depth map.

13. The method of claim 12, wherein the number of taps applied in each pass of the two-pass bilateral filter is equal to 7.

14. A non-transitory computer-readable storage medium storing instructions that, when executed by a processor, cause the processor to perform steps comprising:
    generating a hierarchical depth map including at least two levels; and
    reading a value associated with a sample pixel from a target level of the hierarchical depth map based on a difference between the sample pixel and a target pixel,
    wherein the target level of the hierarchical depth map is calculated by taking a base two logarithm of a ratio of a distance between a screen-space location of the sampled pixel and a screen-space location of a target pixel to a screen space radius increment value;

generating an ambient obscurance map based on the value associated with the sample pixel.

15. The non-transitory computer-readable storage medium of claim 14, the hierarchical depth map comprising:
a base level at a first resolution; and
a first level at a second resolution, wherein the second resolution is less than the first resolution.

16. The non-transitory computer-readable storage medium of claim 15, wherein the base level stores a plurality of values, each value being associated with a different pixel of the digital image, and wherein the first level stores a subset of values selected from the base level.

17. A system comprising:
a processor configured to:
generate a hierarchical depth map including at least two levels; and
read a value associated with a sample pixel from a target level of the hierarchical depth map based on a difference between the sample pixel and a target pixel,
wherein the target level of the hierarchical depth map is calculated by taking a base two logarithm of a ratio of a distance between a screen-space location of the sampled pixel and a screen-space location of a target pixel to a screen space radius increment value;
generate an ambient obscurance map based on the value associated with the sample pixel.

18. The system of claim 17, wherein the processor comprises a graphics processing unit that includes a plurality of processing cores.

19. The system of claim 18, wherein two or more of the processing cores are configured to read values from the hierarchical depth map in parallel.

20. The system of claim 18, the hierarchical depth map comprising:
a base level at a first resolution; and
a first level at a second resolution, wherein the second resolution is less than the first resolution,
wherein the base level stores a plurality of values, each value being associated with a different pixel of a digital image, and wherein the first level stores a subset of values selected from the base level,
wherein the subset of values is selected based on a rotated grid pattern,
wherein the rotated grid pattern is governed by a function that maps a value at a particular level of the hierarchical depth map to a selected value at the next lower level of the hierarchical depth map, wherein the value is associated with a first coordinate and a second coordinate and the selected value is associated with a third coordinate that is equal to the sum of two times the first coordinate and an exclusive bitwise OR of one and a bitwise AND of the second coordinate and one and a fourth coordinate that is equal to the sum of two times the second coordinate and an exclusive bitwise OR of one and a bitwise AND of the first coordinate and one.

* * * * *